United States Patent [19]

Stoll et al.

[11] Patent Number: 4,524,803
[45] Date of Patent: Jun. 25, 1985

[54] SPOOL VALVE

[76] Inventors: Kurt Stoll, Lenzhalde 72, 7300 Esslingen a.N.; Manfred Rüdle, Ermsweg 10, 7300 Esslingen-Berkheim, both of Fed. Rep. of Germany

[21] Appl. No.: 357,015

[22] Filed: Mar. 11, 1982

[30] Foreign Application Priority Data

Mar. 18, 1981 [DE] Fed. Rep. of Germany ... 8107889[U]

[51] Int. Cl.³ ............................................. F15B 13/043
[52] U.S. Cl. ............................ 137/625.64; 137/625.66
[58] Field of Search ............ 137/625.6, 625.64, 625.66

[56] References Cited

U.S. PATENT DOCUMENTS

| 3,895,648 | 7/1975 | Stoll et al. | 137/102 X |
| 3,902,526 | 9/1975 | Brake | 137/625.64 |
| 3,949,645 | 4/1976 | Masclet | 137/625.64 X |
| 4,068,902 | 1/1978 | Deem et al. | 137/627.5 |
| 4,103,711 | 8/1978 | Arvin | 137/625.66 |
| 4,187,884 | 2/1980 | Loveless | 137/625.66 X |
| 4,432,391 | 2/1984 | Ott | 137/625.64 |

FOREIGN PATENT DOCUMENTS

| 2108705 | 8/1972 | Fed. Rep. of Germany | 137/625.69 |
| 2755149 | 9/1978 | Fed. Rep. of Germany | 137/625.66 |
| 1424855 | 2/1976 | United Kingdom | 137/625.6 |

Primary Examiner—Gerald A. Michalsky
Attorney, Agent, or Firm—Flynn, Thiel, Boutell & Tanis

[57] ABSTRACT

A valve which includes a housing, two axially spaced liners and a spool within the liners has fixing screws running through the housing. To make it possible for the screws to be placed near together but without having to make the liners any smaller in diameter, the screw holes are cut through into the liner space in the housing. The screw holes are sealed off from the outside by washers provided under the screw heads and a gasket provided between one outer side of the housing (opposite to the heads) and a support into which the screws extend.

25 Claims, 8 Drawing Figures

SPOOL VALVE

FIELD OF THE INVENTION

The present invention relates to a servo spool or shear action valve and, more particularly, to such a valve, having a valve housing with a ported spool hole and a spool movable in the hole between at least two positions, the spool having fluid control collars for acting with the ports, and with a servo piston system for moving the valve spool in two directions and at least one remotely controlled pilot valve for causing the servo piston system to be put under and freed of pressure.

BACKGROUND OF THE INVENTION

Such servo valves are used in a number of different forms. Representative uses for such valves are to be seen in compressed air and hydraulic circuits for motor vehicles, more specially trucks. For such purposes the servo valves have to be produced in generally small production runs with different design details, as for example for working pressures of 10 or 16 bar. One shortcoming of known servo valves is that it is hard to make small production runs of customized valves at low prices. A further point is that, if for some reason or other the holes for fixing the valves in place and the screws or the like for this purpose are to be placed nearer to each other, there will be the further shortcoming that the valves have to be made smaller in size, this cutting down the rate of flow therethrough, that is to say the size of the ducts for the controlled fluid.

SUMMARY OF THE INVENTION

For this reason, one purpose of the present invention is that of designing a valve system of the sort in question here in which, while decreasing the distance between the holes for fixing the valve in place, the cross-section of ducts through the valve, important for the rate of flow through the valve, is kept unchanged.

For effecting this purpose, and further purposes, in the invention the control ports in the housing are placed in the valve liners which are spaced axially and are symmetric with respect to a middle plane through the housing; the working spaces for the servo piston system are within the valve spool hole within the valve liners; and the valve housing has at least one body shut off at its ends by end plates, of which at least one end plate has an air let-off hole with a large size in cross-section.

With respect to effecting further purposes of the invention, the through-holes for fixing parts such as screws, used for fixing the valve in position, are designed to extend through a middle hole for air running through the body to a greater or lesser degree, each screw or the like having a sealing washer, for example in the form of an O-ring placed between a support shoulder and the lower face of the head of the screw or the like.

The servo spool valve of the present invention has a highly modular design so that the separate parts may be readily changed over for customizing the design, it being possible, for example, to make the liners of metal for high pressure uses whereas for lower pressures valve liners of synthetic resin may be used. In this case, different sealing rings will be used on the control collars of the valve spool. Valve liners of high-impact resin such as polymethyl oxide with sealing rings of polyurethane may be used. For higher pressures valve liners of aluminum, for example, may be used. Another point is that it becomes possible to make use of large sizes of inner parts to get a high rate of flow, even although the distance between the bolts or the like and their holes is decreased. Even with the screws placed so near each other as to be cutting through the middle liner hole of the valve, the size of the cross-section for flow of the fluid is as large as in the prior art, because of the washers being designed and placed in a certain way so that there is no chance of loss of pressure fluid from the inner space or hole in the middle of the valve through the screw holes.

The body of the servo valve of the present invention may be made from a metal section cut off to the desired length, this greatly cutting down the amount of machining needed. Furthermore, no high-price injection casting molds are needed for producing the valve body.

Because an air let-off valve is directly placed within one of the end plates of the valve housing, air is let off very quickly from the servo piston adjacent thereto. For this reason, there are short cycle times.

Further useful developments of the invention will be seen in the claims.

As part of one possible further development of the invention, the air let-off valve has a valve jumper with an axial stem for use with a valve seat, while the edge of the jumper has a U-like cup. An opening joined up with the servo piston space is joined up with the part of the space for the valve which is between the valve jumper and the air let-off valve seat. Such a design, while being very simple mechanically, can be used for effecting the two purposes of controlling the inlet of fluid under pressure and letting off such fluid to and from the servo piston.

It is furthermore possible for the body of the valve to have two fluidwise separate, parallel connection ducts running along the housing, and two groups of connection ports for two pilot valves, some of the pilot valve connection ports being joined up together by a further duct in the housing, and the two connection ducts each opening at a respective one of the two end faces of the valve housing. With this further development of the invention it is possible to make certain that, using the same valve components, it is possible to make up a normal servo valve (using one pilot valve) and a pulse valve (using two pilot valves).

A further development of the invention is characterized in that through-holes for valve fixing parts such as bolts or screws extend through a hole in the housing having the valve liners within it, a gasket placed at the connection ports of the valve running out past the through-hole, and in that, at the opposite end of the through-holes, there are seals which, upon tightening of the screws or bolts, make a tight seal between the head of the screw in question and the valve body.

Such a design makes possible the use of large diameter screws or other fixing parts which are able to take up high forces while nevertheless keeping the valve housing small in size.

Furthermore, one of the servo pistons may be formed by one end face of the valve slide while the second servo piston is housed in a blind hole in the valve spool, such blind hole being joined up with the high pressure connection port of the valve at all times.

As part of a still further development of the invention, two servo pistons are placed in the valve spool so that they may put under pressure separately, such pistons having springs for forcing them into outwardly moved positions. With this further design, it is possible to get a third working position of the spool valve, that is to say a neutral or middle position. Such a three-position valve may be made up, to a high degree, of components used for producing two-position valves.

The valve liners may have pressure balancing cutouts, at least at the limit of one of their control ports, so that the seals on the valve spool are pressure-balanced every time they are moved over the limit of a control port.

It is furthermore possible for the valve liners each to be made up of two liner pieces, one of such liner pieces having spacer fingers running out axially past an end thereof for fixing the size of one of the control ports. This further development of the invention gives a useful effect with respect to producing a valve liner by injection molding, particularly if one of the control ports has pressure-balancing cutouts and the parting plane is placed between the two liner pieces running through this control port.

As a further development of the invention, the walls of metal between the pressure-balancing cutouts have inner rounded corners, this making it possible for the separate sealing rings to be pressure-balanced, it being unimportant on which side of the control port they are located.

For use with high pressures, the spool may have piston rings forced outwards against the inner faces of the liners by rings of elastic material.

BRIEF DESCRIPTION OF THE DRAWINGS

An account will now be given of the invention using the working examples to be seen in the figures.

DETAILED DESCRIPTION

Figure 1:
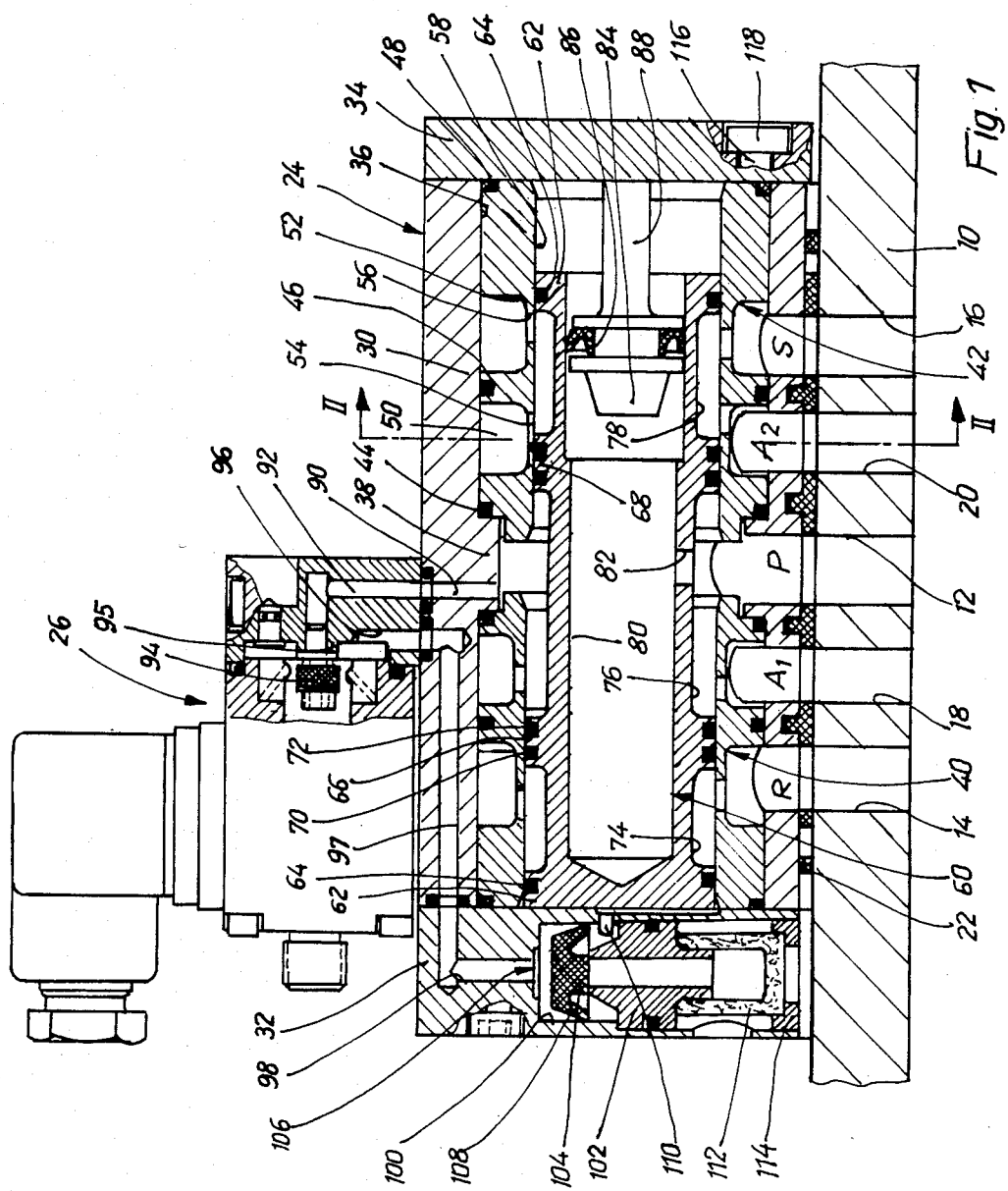
FIG. 1 is an axial section through a 5 port, 2 position servo valve.

In FIG. 1 the reader will see a valve support plate 10 with a high pressure connection or control 12, two low pressure connection or control ports 14 and 16 and two working connection or control ports 18 and 20. Furthermore, on valve support plate 10 there is a gasket 22 which is made of rubber-like material and which has openings P,R,S,$A_1$ and $A_2$ therethrough lined up with connection ports 12 to 20. On gasket 22 there is seated a 5 port, 2 position valve, generally numbered 24 which has a solenoid pilot valve 26 thereon. The valve unit, made up of the spool valve 24 and the pilot valve 26, is screwed onto support plate plate 10 by bolts 28 (see furthermore FIG. 2).

Spool or shear action valve 24 has a housing which includes a body 30, shut off at its two ends by end plates 32, 34. Valve body 30 has a middle air hole 36 running therethrough, this hole having halfway between its ends an inwardly running shoulder 38 acting as a stop on the left and the right for two valve liners 40 and 42, which are the same in all details so that the account now to be given is limited to liner 42. Liner 42 is gas-tightly joined up with shoulder 38 by an O-ring 44, while a gas-tight joint between liner 42 and the wall of the hole 36 is produced by an O-ring 46, the other end of liner 42 being sealed with respect to end plate 34 by an O-ring 48. Valve liner 42 has two broad grooves 50 and 52 in its outer face joined up by way of connection openings 54 and 56 (with an equal angle between them) with a spool hole 58 within the sleeve-like valve liner 42.

A valve spool 60, freely running through the spool hole 58 of the two valve liners 40 and 42, has collars 62 at its ends with annular grooves in which O-rings 64 are seated. Collars 66 and 68 of valve spool 60, in each case, have O-rings 70, 72 provided in annular grooves, whose axial spacing is somewhat greater than the axial length of connection openings or ports 54, 56. The collars 62, 66 and 68 have the function of walling off and ending fluid control grooves 74, 76 and 78 on spool 60, such grooves producing the desired connections between the working connection ports 18 and 20, as may be desired, and the high-pressure connection port 12 or the adjacent port of the low-pressure connection ports 14 and 16.

The valve spool 60 takes the form of a hollow piston, whose inner stepped blind hole 80 is joined up at all times by way of a radial connection port 82 in the outer wall of valve spool 60 with the high-pressure connection port 12. In the part of the hole 80, seen on the right in FIG. 1, a piston is placed, made up of a piston head 84 with a U-cup packing 86. Piston head 84 has a stem 88 running up against end plate 34. In this way, valve spool 60 is, at all times acted upon by a force produced by the pressure of the working fluid, and gives a tendency of pushing the spool into the position of FIG. 1, that is to say in which the high-pressure connection port 12 is joined up with the working connection port 18, whereas the working connection port 20 is joined up by way of fluid control groove 78 with the low-pressure connection port 16.

The high-pressure connection port 12 is furthermore joined up by way of a duct 90 in the housing with the inlet duct 92 of the pilot valve 26, whose moving valve part 94 may be pulled clear of a valve seat 95 at the end of the inlet duct 92 by a solenoid (not to be seen in detail), so that a connection is produced with an outlet duct 96 of pilot valve 26, duct 96 joining up with the generally axial connection duct 97 in housing body 30. Duct 97 is joined up at the end face of body 30 with an aligned inlet duct 98 in the end plate 32, which extends to a valve space 100 formed in the end plate 32. Within valve space 100, there is a valve seat 102 producing a valve function with the middle part 104 of a valve member or valve jumper 106, whose outer edge is formed as a U-cup packing 108, jumper 106 forming a check valve system.

The space to be seen in FIG. 1 under the jumper 106 and over the valve seat 102 is joined up by way of a port 110 with the left hand end, as seen in FIG. 1, of the valve spool hole 58 of valve liner 40.

At its outlet end, valve seat 102 has a muffler 112 rested on a fixing or retaining ring 114.

The spool hole 58 within liner 42 is joined up with an air let-off hole 116 in the end plate 34 having a filter 118 within it.

An account will now be given of the operation of this servo valve.

If the solenoid pilot valve 26 is not turned on electrically, valve spool 60 will be kept in the first position, to be seen in FIG. 1 and, on turning on solenoid valve 26, the left hand end of valve spool 60 will be acted upon by pressure, cup-like packing 108 of jumper 106 being pushed back out of the way by the pressure. Valve spool 60 will now be moved to the right because of the differential pressure effect on it, that is to say to the right as the valve is seen in FIG. 1, the right hand end of the spool then coming up against the end plate 34. In this working position, the high-pressure connection port 12 is joined up with the working connection port 20 while the working connection port 18 is joined with the low-pressure port 14. On turning off solenoid pilot valve 26, the pressure in inlet duct 92 will go down, jumper 106 when whipping upwards and pressure being let off from the left hand end face of valve spool 60 by way of valve seat 102 and muffler 112, spool 60 then running over to its left hand position (FIG. 1) at a high speed, because the let-off valve (parts 102, 106) is made a part of end plate 32 itself and the letting off of the compressed air takes place through openings which are large in cross-section and small in length.

Figure 2:
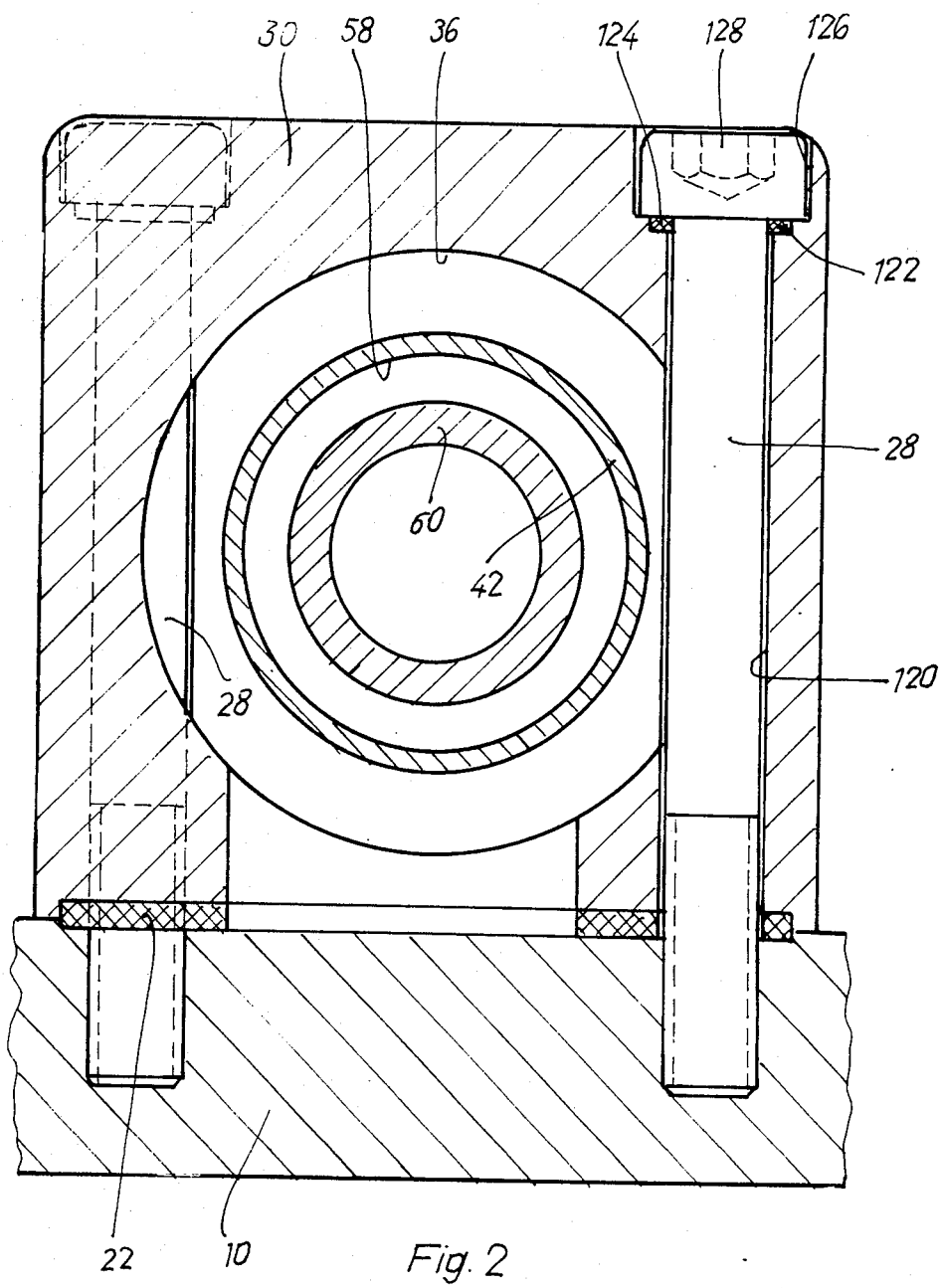
FIG. 2 is a cross-section through the valve of FIG. 1 on the section line II—II marked in FIG. 1.

As the reader will see from FIG. 2, the through-holes 120 in the valve body 30 for taking up bolts 28 are designed cutting through the air hole 36 in the valve body, this making it possible for large diameter bolts 28 to be used without (overly) increasing the width of the valve body 30. For sealing off the through-holes 120, use is made on the support plate side of gasket 22 while the top ends, seen in FIG. 2, of through-holes 120 are sealed off by elastic washers 122, each taken up in a washer groove 124. Such groove is at the lower end of a pocket 126 in which the head 128 of the bolt 28 is placed. Head 128 is forced against the floor of pocket 126 after tightening bolt 28 so that gasket 122 is forced together to a given degree as designed for, no more, no less.

Figure 3:
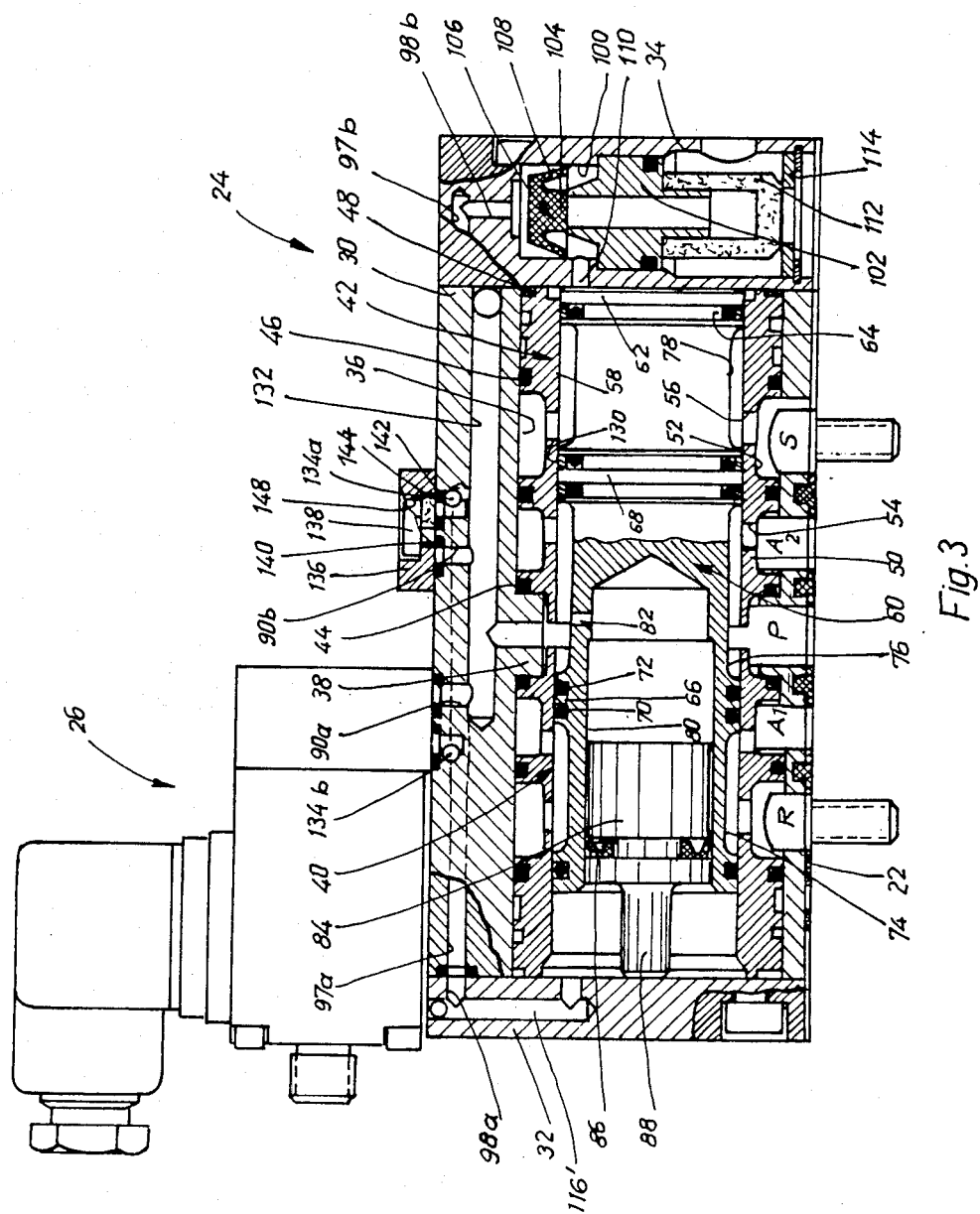
FIG. 3 is an axial section through a somewhat changed form of a 5 port, 2 position servo valve.

The 5 port, 2-position servo valve of FIG. 3 is by and large very much like that to be seen in FIGS. 1 and 2, like parts being marked with the same part numbers.

The servo valve of FIG. 3 is different to that of FIGS. 1 and 2 in that the O-rings 64, 70, 72 of valve spool 60 are not placed running directly on liners 40, 42 in spool holes 58 and, in fact, such rings are used for radially elastically forcing outwards piston rings 130 made of PTFE (Teflon).

Furthermore, there is a pilot inlet duct 132 running in the length-direction of the body 30 and communicating with two housing ducts 90a and 90b, which are placed symmetrically with respect to the middle plane of the body 30, such ducts 90a and 90b taking over the function of the housing duct 90 in FIG. 1. Furthermore, there are two end parts 134a and 134b of two connection ducts 97a and 97b running parallel to each other in the length-direction of the housing, the end parts 134a and 134b running crosswise through the body and symmetrically with respect to its middle plane. Connection duct 97a comes to an end in the end face on the left in FIG. 3 of body 30, while connection duct 97b comes to an end at the right hand end face of body 30.

The housing duct 90b is shut off air-tightly by a cover plate 136 using a screw 138 in body 30 and an O-ring 140. Duct part 134a is air-tightly sealed off by way of an O-ring 142 with respect to cover plate 136 and is joined up with the outside atmosphere by a filter body 144 and an opening 148, lined up with the filter body, in cover plate 136.

The workings of the servo valve of FIG. 3 are generally the same as those of the valve of FIG. 1, but in the valve of FIG. 3 there is an air let-off hole 116' joining up with the end of connection duct 97a so that using generally the same standard parts for the pilot valve 26, the valve body 30, the end plate 32, 34 and the rest of the parts of the valve, it is possible to make 5 port servo valves with 2 and 3 working positions, only some small changes in valve spool 60 being needed.

Figure 4:
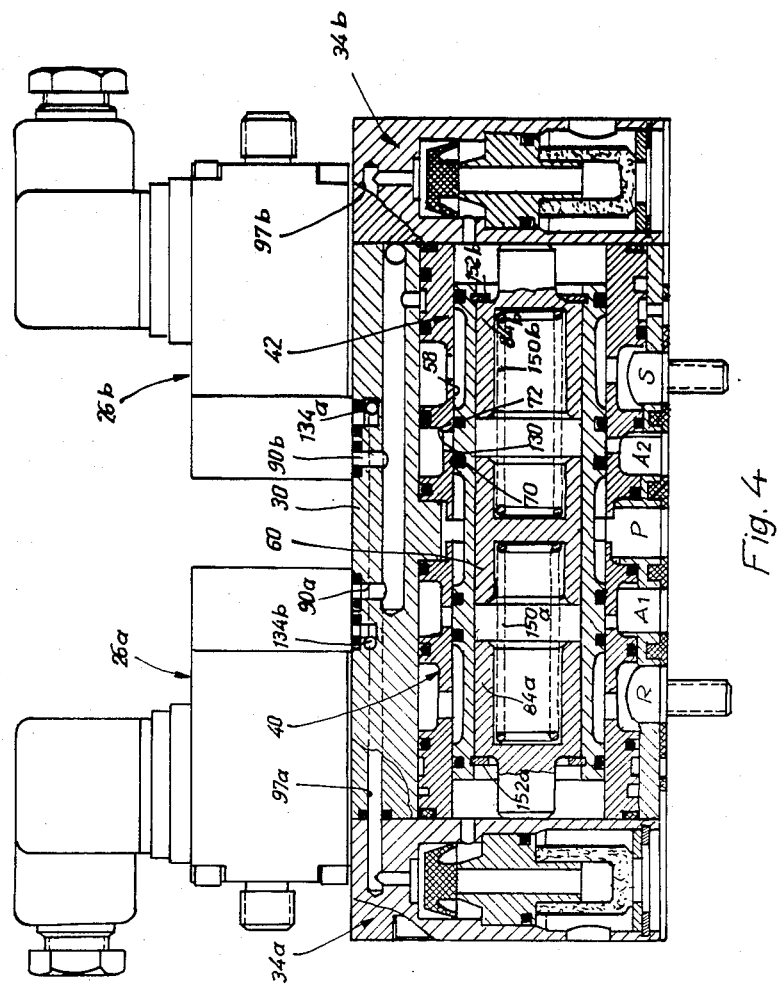
FIG. 4 is a section through a further 5 port, 3 position servo valve made up of parts as used in the valve of FIG. 3.

FIG. 4 is a view of a servo valve which is very much the same as that of FIG. 3 but, furthermore, has a middle position.

In the servo valve of FIG. 4, there are, on the one hand, two end plates 34a and 34b, each having a high speed air let-off valve as detailed in connection with FIG. 1. Furthermore, cover plate 136 has been unscrewed and taken off and its place taken by a second solenoid pilot valve 26b.

Valve spool 60 no longer has the connection port 82: two piston bodies 84a and 84b are symmetrically placed in the spool which are acted upon by helical compression springs 150a and 150b so that they have the tendency of moving axially outwards. Circlips 152a and 152b are used to keep piston bodies 84a and 84b within the valve spool 60.

An account will now be given of the operation of the valve of FIG. 4.

If the two solenoid pilot valves 26a and 26b are turned off, the piston bodies 84a and 84b are freed of pressure, the valve spool 60 being then pushed by helical compression springs 150a and 150b into the middle position, see FIG. 4.

On solenoid pilot valve 26a being turned on, by way of connection duct 97b and end plate 34b, the right hand end face of valve spool 60 will be acted upon by pressure, the spool then moving to the left in FIG. 4, that is to say moving into a first working position in which the working port $A_1$ is joined up with the pressure connection P and the working port $A_2$ is joined up with the low-pressure port S.

If, oppositely, solenoid pilot valve 26b is turned on, the left hand end face of the valve spool 60 will be acted upon by pressure by way of connection duct 97a and the end plate 34a so that the valve spool 60 will be moved to the right in FIG. 4; in this second working position, the working port $A_1$ is joined up with the low-pressure port R and the working port $A_2$ is joined up with the pressure port P.

If the two solenoid pilot valves 26a and 26b are turned on at the same time, the valve spool 60 will again be acted upon by balanced forces, that is to say it will be pushed into a middle position by the two helical compression springs 150a and 150b.

Figure 5:
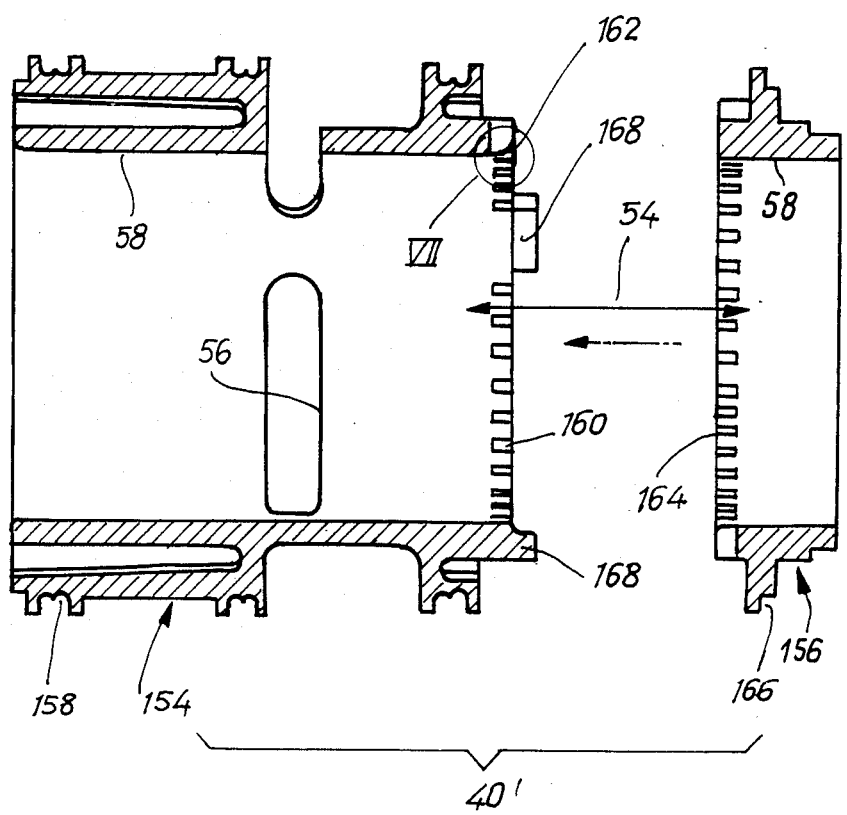
FIG. 5 is a view of a changed form of a valve liner used in the valve of FIG. 4.
Figure 6:
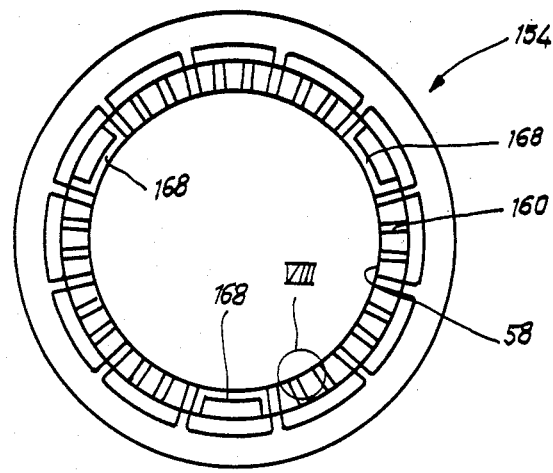
FIG. 6 is an end-on view of the right hand end of the liner of FIG. 5.

A somewhat different form of valve liner 40' will be seen in FIG. 5, which may be used to take the place of valve liners 40 and 42. Parts of the valve liner which are the same as the parts noted earlier have the same part numbers so that no new account is given thereof.

Valve liner 40' is made up of two liner pieces 154 and 156, liner piece 154 having connection ports 56 with the function of a fluid control port. Furthermore, liner piece 154 has outer grooves for the different sealing rings resting against the inner wall of the valve body 30, such grooves having lips 158 on their floors, as may be seen in section, so that the O-rings are kept in position without any chance of them being twisted. Liner piece 154 has, at its right end (right in the sense of FIG. 5) a number of pressure-balancing cutouts 160, the pieces of material therebetween being rounded off at 162 near the inner face of the hole 58, as may be more specially seen in FIG. 7. On the same lines the liner piece 156 has, at its side turned towards liner piece 154, pressure-balancing cutouts 164, the pieces of material or teeth therebetween being rounded off or radiussed in the inside as well. Liner piece 156 has an axially open groove-like pocket 166 for an O-ring such as ring 44 (FIG. 1).

The right hand end (FIG. 5) of liner piece 154 has three spacing fingers 168 so that liner piece 156 may not be rested completely flatly against liner piece 154 and, in fact, a space is kept between the two liners 154 and 156 with the connection ports 54 defined therebetween, such ports 54 functioning as fluid control ports for use with the control collars of valve spool 60. As may be seen from the figure, the spacer fingers 168 are lined up axially with untoothed pieces of material between the connection ports 56. With respect to the function, the breadth of the connection ports 54 may be seen to be dependent on the axial size of the spacer fingers 168 with the addition of the sum of the depth of the balancing cutouts 166, 164.

As may be seen from the spacer fingers 168 on the lower right in FIG. 5, the inner face of such fingers is out of line in a radially outward direction with respect to the valve spool hole 58 so that the sealing ring units (in FIG. 1: 70, 72; in FIGS. 3 and 4: 70, 130, 73, 130) supported on the control collars of the valve spool may become wider in a radial direction when they are moved across the space between the inlet pieces 154 and 156.

Figure 7:
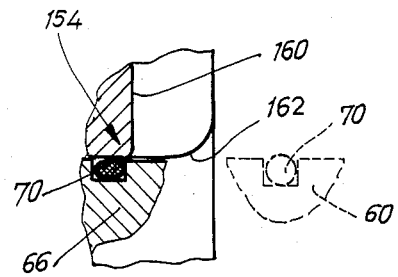
FIG. 7 is a view on a greater scale of the portion, marked as VII in FIG. 5, of the valve liner.

FIG. 7 is a view on a greater scale of one of the pressure-balancing cutouts 160 and one of the rounded-off structures 162. In addition, the reader will see a part of control collar 66 with O-ring 70, the position of the valve spool being such that the O-ring 70 is still resting fully against the inner face of the liner spool hole 58 and it will be seen that O-ring 70 is greatly forced together. This is made clear further by the rough view on the right of FIG. 7 in broken lines to make clear the condition of the O-ring 70 after it has been moved past the limit of the control port. It will be seen that the rounded structure 162 makes it more readily possible for the O-ring 70 to be moved backwards and forwards over the limit of the control port so that wear is cut down. A further point is that the groove with the O-ring 70 therein is joined up with the outside when the O-ring 70 is put under pressure and freed of pressure, by way of pressure-balancing cutouts 160, so that not only on moving the valve spool 60 to the right, but furthermore on moving it to the left, pressures will be balanced at the O-ring 70 when it is moved past the limit of the control port.

Figure 8:
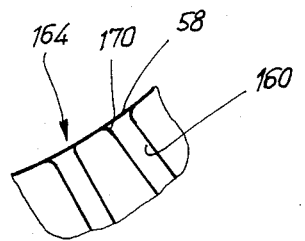
FIG. 8 is a view on a greater scale of the portion, marked as VIII in FIG. 6, of the valve liner.

As may be seen from FIG. 8, the teeth or walls between the pressure-balancing cutouts 160 may be seen to be rounded off at their radially inner corners parallel to the spool axis at 170, this, as well, making it more readily possible for the O-rings to be moved across the limits of the control ports.

The embodiments of the invention in which an exclusive property or privilege is claimed are defined as follows:

1. A spool valve having at least two positions, comprising: a valve housing having means defining therein a spool hole and plural control ports for fluid control which communicate with said spool hole; a valve spool axially movably supported in said spool hole and having fluid control collar means thereon for effecting fluid connections between selected ones of said ports in response to movement of said valve spool; servo piston means for moving said valve spool in two axial directions; and pilot valve means which can be remotely controlled for putting said servo piston means under pressure and freeing it of pressure; wherein said valve housing includes a body having a central opening therethrough and having openings therein which each serve as a portion of a respective one of said ports, two end plates shutting off said central opening at opposite ends of said body, and two liners which have therein said spool hole and openings which each serve as a portion of a respective one of said ports, said liners being positioned symmetrically in said central opening through said body with respect to a plane which is normal to the axis of said spool hole and being axially spaced from each other, and said servo piston means including spaces provided within said spool hole in said liners; including an air let-off valve provided in one of said end plates, said let-off valve having a large air flow cross-section; including a support plate for said valve housing, said support plate having plural connection openings which each communicate with a respective said port in said valve housing; and means which includes plural fixing parts for fixing said valve to said support plate, each said fixing part having a stem which extends through a through-hole provided in said valve body and which has a threaded portion which threadedly engages a threaded hole provided in said support plate, each said fixing part further having a head at an end thereof remote from said threaded hole, said head being disposed in a wider end portion of said through-hole and resting against a shoulder located between said wider end portion of said through-hole and a narrower portion thereof, said through-holes communicating with said central opening through said housing body, and said valve furthermore having for each said fixing part a sealing ring washer which encircles said stem adjacent said head for producing a seal between said head and said shoulder of said through-hole.

2. A valve as claimed in claim 1, wherein said servo piston means includes two servo pistons; wherein said air let-off valve includes a valve jumper having an axial stem and a cup-like annular packing therearound, said air let-off valve furthermore having means defining a valve seat part engageable with said stem; and wherein an axial space provided between said valve jumper and said valve seat part of said let-off valve communicates with a servo piston space having one of said servo pistons movably supported therein.

3. A valve as claimed in claim 2, wherein said air let-off valve includes a muffler which is provided at an outlet end of said valve seat part and has a large air duct cross-section.

4. A valve as claimed in claim 1 or claim 2, including fluid ducts in said end plates which end at end faces of said valve housing.

5. A valve as claimed in claim 1 or claim 2, wherein said control ports are all provided in one side face of said valve housing, and wherein at least one connection port for said pilot valve means is provided in a further side face of said housing.

6. A valve as claimed in claim 1 or claim 2, wherein said control ports are all provided in a common first side face of said valve housing, and wherein connection ports for said pilot valve means are provided in a further side face of said housing which is opposite to said first side face.

7. A valve as claimed in claim 1, wherein said pilot valve means includes said valve body being adapted to have two pilot valves mounted thereon, and includes a first connection duct in said body of said valve housing which extends lengthwise of said valve housing, which communicates with two first connection ports which are provided in said body and are each adapted to communicate with a respective said pilot valve, and which opens through an end face provided at one end of said valve housing body.

8. A valve as claimed in claim 7, wherein said body of said valve housing has two separate and parallel second connection ducts provided in and extending lengthwise of said body of said valve housing and two second connection ports provided in said body which each effect fluid communication between a respective said second connection duct and a respective one of said pilot valves, and wherein one of said second connection ducts opens through said one of said end faces of said valve housing.

9. A valve as claimed in claim 8, including a cover plate for covering one of said first and one of said second connection ports, said cover plate shutting off the associated first connection port fluid-tightly and providing communication between the associated second connection port, by way of a filter, and the atmosphere.

10. A valve as claimed in claim 1, wherein said servo piston means includes two pistons movably supported in respective openings provided in opposite ends of said valve spool, and includes springs which urge said pistons outwardly.

11. A valve as claimed in claim 1, wherein said liners each have, at one of said openings therein which serves as a portion of one of said control ports, pressure-balancing cutouts.

12. A valve as claimed in claim 11, wherein an inner surface of each said liner has, between said cutouts and at said one opening therein, rounded corners.

13. A valve as claimed in claim 1, wherein said liners are each made in two pieces, one of said pieces having axially extending spacer fingers for spacing said liner pieces and for producing one of said control ports.

14. A valve as claimed in claim 1, wherein said liners are injection molded.

15. A valve as claimed in claim 1, wherein said valve housing is a piece of metal.

16. A valve as claimed in claim 1, wherein said control collar means includes plural control collars on said spool which each have two axially spaced annular seals thereon with an axial spacing between them which is greater than the axial length of the control port with which they are used.

17. A valve as claimed in claim 16, wherein each said annular seal includes a piston ring and an elastic O-ring which urges the piston ring radially outwardly against an inner surface of said liner.

18. A spool valve having at least two positions, comprising: a valve housing having means defining therein a spool hole and plural control ports for fluid control which communicate with said spool hole; a valve spool axially movably supported in said spool hole and having fluid control collar means thereon for effecting fluid connections between selected ones of said ports in response to movement of said valve spool; servo piston means for moving said valve spool in two axial directions; and pilot valve means which can be remotely controlled by putting said servo piston means under pressure and freeing it of pressure; wherein said valve housing includes a body having a central opening therethrough and having openings therein which each serve as a portion of a respective one of said ports, two end plates shutting off said central opening at opposite ends of said body, and two liners which have therein said spool hole and openings which each serve as a portion of a respective one of said ports, said liners being positioned symmetrically in said central opening through said body with respect to a plane which is normal to the axis of said spool hole and being axially spaced from each other, and said servo piston means including spaces provided within said spool hole in said liners; including an air let-off valve provided in one of said end plates, said let-off valve having a large air flow cross-section; wherein said servo piston means includes two servo pistons; wherein said air let-off valve includes a valve jumper having an axial stem and a cup-like annular packing therearound, said air let-off valve furthermore having means defining a valve seat part engageable with said stem; wherein an axial space provided between said valve jumper and said valve seat part of said let-off valve communicates with a servo piston space having one of said servo pistons movably supported therein; wherein said pilot valve means includes said valve body being adapted to have two pilot valves mounted thereon, and includes a first connection duct in said body of said valve housing which extends lengthwise of said valve housing, which communicates with two first connection ports which are provided in said body and are each adapted to communicate with a respective said pilot valve, and which opens through an end face provided at one end of said valve housing body; wherein said body of said valve housing has two separate and parallel second connection ducts provided in and extending lengthwise of said body of said valve housing and two second connection ports provided in said body which each effect fluid communication between a respective said second connection duct and a respective one of said pilot valves; wherein one of said second connection ducts opens through said one of said end faces of said valve housing; wherein said valve includes a support plate which is disposed adjacent said valve body and which has plural connection openings which each communicate with a respective said control port in said valve housing, wherein through-holes for valve fixing parts are provided in said body and communicate with said central opening in said body in which said liners are placed, and including a gasket disposed between said valve housing and support plate, having holes lined up with said control ports of said valve body, and having further holes lined up with said through-holes in said valve body, said through-holes having washers at ends thereof remote from said gasket which, when said fixing parts are disposed in said through-holes and are securely fixing said valve housing on said support plate, provide an air-tight seal between a head of each of said fixing parts and said valve housing.

19. A valve as claimed in claim 18, wherein said servo piston means includes two servo pistons, one of said servo pistons being formed by an end face of said spool and the other servo piston being disposed in a blind hole provided in the opposite end of said spool, said servo piston means further including means for providing fluid communication between said blind hole and one of said control ports of said valve housing.

20. A valve, comprising: a body having first and second end surfaces at opposite ends thereof, a central bore extending between and opening through said end surfaces, plural control ports extending through said body from a first side surface thereof to said central bore, first and second connection ports provided in a second side surface of said body, means defining a first passageway which provides fluid communication between said first connection port and a first one of said control ports, and means defining a second passageway which communicates with said second connection port and opens through said second end surface; first and second end plates which are sealingly mounted against said first and second end surfaces, said second end plate having means defining a first let-off valve therein which is actuated by fluid pressure and can selectively provide fluid communication between the adjacent end of said bore in said body and one of said second passageway and a let-off opening of large cross-sectional size provided in an exterior surface of said second end plate; a first pilot valve which is supported on said valve body in fluid communication with said first and second connection ports and is adapted to selectively permit and interrupt fluid communication between said first and second connection ports; valve insert means sealingly supported in said central bore in said body, having a central opening therethrough, and having means defining plural openings therein which each provide fluid communication between said central opening and a respective one of said control ports in said body, said valve insert means including two sleevelike, axially spaced valve inserts; a spool which is supported in said central opening through said valve insert means for axial movement between first and second positions, which has means defining axially spaced annular control collars and defining annular seal means on each said control collar which sealingly engages an inner surface of said central opening through said valve insert means, and which has means defining an axially extending opening in an end thereof which faces said first end plate; a servo piston which is axially slidably supported in and sealingly engages said opening in said spool, and which has a portion adapted to engage said first end plate; means for yieldably urging axial movement of said spool toward said second end plate relative to said servo piston; and third and fourth connection ports provided in a side surface of said valve body other than said first side surface thereof, said third connection port being in fluid communication with said first passageway; wherein said valve body includes means defining a third passageway therein which communicates with said fourth connection port and opens through said first end surface of said body.

21. The valve according to claim 20, wherein said means for yieldably urging movement of said spool relative to said servo piston includes means defining an opening in said spool which provides continuous fluid communication between said first control port and an inner end of said axially extending opening in said spool; wherein said first end plate has means defining an opening therethrough which provides fluid communication between said bore through said body and the atmosphere surrounding said valve; and including a filter which is disposed in said opening through said first end plate.

22. The valve according to claim 20, including a cover adapted to be releasably secured on said body in the region of said third and fourth connection ports, said cover obstructing fluid flow through said third connection port and having a filter which is disposed over said fourth connection port so that fluid flowing through said fourth connection port flows through said filter.

23. The valve according to claim 20, including: a second pilot valve which is releasably secured on said valve body in the region of and in fluid communication with said third and fourth connection ports and is adapted to selectively permit and interrupt fluid communication between said third and fourth connection ports; means defining a second let-off valve in said first end plate which is actuated by fluid pressure and can selectively provide fluid communication between an end of said bore in said body adjacent said first end plate and a selected one of said third passageway and a let-off opening of large cross-sectional size provided in an exterior surface of said first end plate; means defining a further axially extending opening in an end of said spool which faces said second end plate; a further servo piston which is sealingly, axially slidably supported in said further opening in said spool and has a portion adapted to engage said second end plate; wherein said means for yieldably urging movement of said spool relative to said servo piston includes a helical compression spring which is disposed within said first-mentioned opening in said spool and has its ends supported on said first-mentioned servo piston and a surface of said spool; and including a further helical compression spring which is disposed in said further opening in said spool and has its ends supported on said further servo piston and a surface of said spool.

24. The valve according to claim 20, wherein said let-off valve includes means defining a chamber in said second end plate, said second end plate having passageways which respectively provide communication between first and second sides of said chamber and a respective one of said let-off opening and said second passageway, and having a further passageway which provides fluid communication between said first side of said chamber and the adjacent end of said bore in said body; and wherein said let-off valve further includes a valve member supported in said chamber for movement between two positions in which a central stem portion thereof is respectively obstructing fluid flow through said let-off opening and through said second passageway, said central stem portion being surrounded by an annular packing which can sealingly engage an inner surface of said chamber and is adapted to permit fluid flow past said valve member from said second passageway to said bore through said body and to obstruct fluid flow past said valve member from said bore through said body to said second passageway.

25. The valve according to claim 20, wherein each said valve insert includes first and second insert pieces, one of said insert pieces having axially extending spacer fingers for maintaining said insert pieces in an axially spaced relationship, the region between said insert pieces being one of said openings through said valve insert means which communicates with a respective one of said control ports, and wherein the adjacent ends of said valve insert pieces each have angularly spaced cutouts and a rounded inner corner.

* * * * *